United States Patent
Li et al.

(10) Patent No.: US 8,309,240 B1
(45) Date of Patent: Nov. 13, 2012

(54) ENCAPSULATED FIRE-RETARDANT MATERIALS TO IMPROVE BATTERY SAFETY

(75) Inventors: Wen Li, El Segundo, CA (US); Ping Liu, Irvine, CA (US)

(73) Assignee: HRL Laboratories, LLC, Malibu, CA (US)

( * ) Notice: Subject to any disclaimer, the term of this patent is extended or adjusted under 35 U.S.C. 154(b) by 821 days.

(21) Appl. No.: 12/395,638

(22) Filed: Feb. 28, 2009

(51) Int. Cl.
*H01M 10/52* (2006.01)

(52) U.S. Cl. .................. 429/57; 429/122; 29/623.1

(58) Field of Classification Search .......... 429/57, 429/122; 29/623.1, 623.5
See application file for complete search history.

(56) References Cited

U.S. PATENT DOCUMENTS

| | | | |
|---|---|---|---|
| 6,168,885 B1 * | 1/2001 | Narang et al. | ........... 29/623.1 X |
| 2009/0162748 A1 * | 6/2009 | Fan et al. | ...................... 429/175 |

FOREIGN PATENT DOCUMENTS

JP           05-151971    *   6/1993

* cited by examiner

*Primary Examiner* — Stephen J. Kalafut
(74) *Attorney, Agent, or Firm* — O'Connor & Company

(57) ABSTRACT

This invention provides a battery, such as a lithium-ion battery, that includes an encapsulated fire-retardant material. In some embodiments, stable polymer spheres are used to encapsulate an effective fire-retardant material. Under normal operating conditions, the fire-retardant material does not contact the electrolyte, cathode, or anode, thus minimizing performance reduction that occurs when fire-retardant materials are in the direct presence of the electrolyte. Under thermal runaway or excessive temperatures, the fire retardant material vaporizes through the melted encapsulating phase, thereby releasing fire-retardant material to minimize or prevent flammability in the battery.

34 Claims, 7 Drawing Sheets

STRUCTURE OF CYLINDRICAL BATTERY

FIG. 7

FR material adsorbed porous mandrel rod

Coated porous mandrel rod with adsorbed FR materials.

Porous Mandrel Rod

ENCAPSULATED FIRE-RETARDANT MATERIALS TO IMPROVE BATTERY SAFETY

FIELD OF THE INVENTION

The present invention generally relates to improved lithium-based batteries, and methods of making and using such batteries.

BACKGROUND OF THE INVENTION

Batteries based on lithium (Li), such as lithium-ion batteries, are attractive due to their high energy density compared to other commercial batteries (e.g., alkaline batteries). Li-ion batteries are used commercially in computers, cell phones, and related devices. Li-ion batteries have potential for use in electric vehicle/hybrid-electric vehicle (EV/HEV) applications. The most-suitable battery technology, which offers both a sufficient range and enough power to provide the acceleration required by today's drivers, is the lithium-ion battery system (Grove and Burgleman, *The McKinsey Quarterly*, December 2008). However, safety requirements currently dictate the use of low-voltage Li-ion batteries. The major safety concern is flammability, which poses a serious problem today.

In a typical Li-ion battery, the $Li^+$ cation moves from the anode to the cathode (discharging) or cathode to anode (charging). The electrolyte is a lithium salt in an organic solvent. Common carbonate-based electrolytes are flammable and may lead to fire in cases such as short circuiting and/or overcharging of the battery (S. Tobishima and J. Yamaki, *J. Power Sources*, 81-82, 882, 1999). Thermal decomposition of the carbonate solvents in the electrolyte and the metal-oxide cathode leads to generation of hydrogen radicals and oxygen, respectively. When hydrogen radicals and oxygen react, a chain reaction can generate a large amount of heat in the battery.

Fire-retardant materials have been studied and proposed for Li-ion batteries. Fire-retardant materials should reduce the rate of chain reactions of hydrogen and oxygen or react with Li ions to form stable compounds, thereby preventing thermal runaway in the battery.

Direct incorporation of a fire-retardant material as an additive or cosolvent into an electrolyte system leads to battery performance reduction. For example, trimethyl phosphate (TMP) has been found to be an effective fire-retardant material in a Li-ion battery. High TMP/cosolvent concentrations can effectively suppress the flammability, but at the expense of battery performance. TMP-related performance reduction results from electrochemical instability of phosphates causing severe capacity fading, as well as high viscosity of cosolvents which reduces capacity utilization and power.

One of the significant efforts to improve the safety concern of the lithium-ion batteries is to reformulate electrolytes by employing flame retardants to suppress the fire and explosion tendencies of the lithium-ion batteries (C. W. Lee et al., *Electrochem. Solid-State Lett.*, 3, 63, 2000; S. C. Narang et al., U.S. Pat. No. 5,830,660, 1998; X. M. Wang et al., *J. Electrochem. Soc.*, 148, A1058, 2001; X. M. Wang et al., *J. Electrochem. Soc.*, 148, A1066, 2001). The non-flammability of TMP was explained by a flame-retarding mechanism involving a hydrogen radical trap in the gas phase (Z. E. Jolles, *Plast. Polym.*, 40, 319, 1971; W. G. Schmidt, *Trans. J. Plastics Inst.*, 1965, 248).

Wang et al. (Xianming Wang et al., *Journal of The Electrochemical Society*, 148, 10, A1058-A1065, 2001) found that the TMP solvent had good oxidation stability and poor reduction stability, which led to TMP reduction decomposition on the natural graphite electrode at the negative potential of 1.2 V. To solve this problem, ethylene carbonate, propylene carbonate, and diethyl carbonate cosolvents were mixed with TMP solvent. The authors claimed that the reduction decomposition of the TMP solvent was considerably suppressed in TMP containing these three cosolvents. The performance improvement was attributed to the formation of good solid-electrolyte interphase film on natural graphite electrode in the mixed electrolyte.

Xu et al., *Journal of The Electrochemical Society*, 149, 5, A622-A626, 2002, studied effects of using alkyl phosphates and a cyclophosphazene as cosolvents on the non-flammability of TMP-based electrolytes for lithium-ion batteries. It was found that although the cosolvents at high contents (10%) effectively suppress the flammability of the electrolyte, their flame-retarding effectiveness is still insufficient to render the electrolytes completely nonflammable. Furthermore, such reduction in electrolyte flammability is always realized at the expense of performance, according to this publication.

Xu et al., *Journal of The Electrochemical Society*, 150 (2), A161-A169, 2003, studied fluorinated versions of phosphates as modified flame retardants. It is known that both phosphorous and flourine are effective flame-retarding elements. The authors hoped that such combinations of these elements into a single molecule would work more effectively than they would separately. It was described therein that the addition of these fluorinated phosphates to electrolyte solutions reduced the overall flammability at the expense of ion conduction, while electrochemical stability on carbonaceous anodes was improved.

So far, attempts to formulate an electrolyte based on TMP that is non-flammable and also works well in lithium-ion cells has not been very successful. There always has been a trade-off between electrolyte flammability and its performance either due to the electrochemical instability on graphitic anode, e.g., triethyl phosphate (TEP) and trimethyl phosphate (TMP), or due to other adverse properties of the fire-retardant materials, such as high melting point and high viscosity.

Due to reduced performance, flame retardants reported in the prior art are normally used only at very low concentrations, usually about 5% or less, an amount that is insufficient to render the system non-flammable (X. M. Wang, et al., *J. Electrochem. Soc.*, 148, A1058, 2001; X. M. Wang, et al., *J. Electrochem. Soc.*, 148, A1066, 2001; C. W. Lee et al., *Electrochem. Solid-State Lett.*, 3, 63~2000). Low efficiency of these materials in flame retarding further worsens the trade-off, because as higher flame-retardant content is needed in the electrolyte to reduce the flammability to a desired level, the negative impact on performance increases proportionally with flame-retardant content.

In view of the significant aforementioned shortcomings described with respect to the prior art, methods and systems are needed to provide high-voltage batteries (e.g., high-voltage Li-ion batteries) while meeting safety requirements due to flammability. Specifically, what are needed are methods and systems that can minimize capacity fading, increase capacity utilization, and maintain power during use.

SUMMARY OF THE INVENTION

The present invention addresses the aforementioned needs in the art, as will now be summarized and further described in detail below.

In some variations of this invention, a battery is provided, the battery comprising an electrolyte, a negative electrode, a positive electrode, and a substantially encapsulated fire-retardant material. The battery can be a lithium-based battery, such as a lithium-ion battery.

In some embodiments, the fire-retardant material is capable of terminating a reaction involving a hydrocarbon-based organic material and oxygen. In some embodiments, the fire-retardant material is capable of reducing (preferably stopping) the migration of lithium ions between negative and positive electrodes. For example, the fire-retardant material can react with lithium ions.

The fire-retardant material can be a solid or a liquid at 25° C., or the fire-retardant material can actually be a mixture of solid and liquid components at 25° C.

In some embodiments, the fire-retardant material has a normal boiling point above an operation temperature of the battery and below a thermal runaway temperature of the battery. In certain embodiments, the fire-retardant material has a normal boiling point selected from about 80° C. to about 200° C.

The fire-retardant material can be selected from the group consisting of an alkyl phosphate, a phosphazene, and a fluorinated derivative of any of the foregoing. For example, the fire-retardant material can be trimethyl phosphate.

In preferred embodiments of the invention, the fire-retardant material is encapsulated with one or more materials selected from the group consisting of an oligomer, a polymer, a hydrocarbon, and an ionic liquid.

In some embodiments, the fire-retardant material, in free form, is not itself electrochemically or chemically stable in the presence of the electrolyte, but the substantially encapsulated fire-retardant material is electrochemically and chemically stable in the presence of the electrolyte.

The substantially encapsulated fire-retardant material can further include a porous matrix. This porous matrix can be fabricated, for example, from one or more materials selected from the group consisting of $SiO_2$, $TiO_2$, $Al_2O_3$, and C. The porous matrix can be fabricated from hollow glass microspheres, in some embodiments.

Optionally, the negative electrode can be adjacent to a first portion of the substantially encapsulated fire-retardant material, and the positive electrode can be adjacent to a second portion of the substantially encapsulated fire-retardant material.

It is also possible to construct a battery of the invention such that at least some of the substantially encapsulated fire-retardant material is not adjacent to either of the negative electrode or the positive electrode. For example, the battery can include a porous mandrel rod, wherein the rod substantially encapsulates the fire-retardant material.

In certain variations, the invention provides a lithium-ion battery comprising an electrolyte, a negative electrode, a positive electrode, and a fire-retardant material substantially encapsulated with a polymer. The fire-retardant material, while not being limited, can be selected from the group consisting of an alkyl phosphate, a phosphazene, and a fluorinated derivative of any of the foregoing. Preferably, the fire-retardant material has a normal boiling point above an operation temperature of the battery and below a thermal runaway temperature of the battery.

The polymer, while also not being limited, can be selected from the group consisting of an olefinic polymer, a vinyl polymer, an acrylic polymer, a polyamide polymer, a polyoxide polymer, and any mixtures of the foregoing. Exemplary polymers include poly(1-butene), polyethylene, and 1,4-poly (2,3-azabutadiene). Preferably, the melting point of the polymer is less than a thermal runaway temperature associated with the battery. The lithium-ion battery can include a plurality of polymer spheres each including some of the fire-retardant material encapsulated by some of the polymer.

Other variations of the invention relate to methods of constructing or fabricating batteries, such as lithium-ion batteries. In some variations, a fabrication method comprises:
(a) providing an electrolyte;
(b) providing a fire-retardant material;
(c) encapsulating at least some of the fire-retardant material with a coating that is stable in the presence of the electrolyte;
(d) providing negative and positive electrodes; and
(e) combining the electrolyte, encapsulated fire-retardant material from step (c), and the negative and positive electrodes in a suitable construction for the battery.

Other method variations of the invention include the following steps:
(a) receiving an electrolyte;
(b) receiving a fire-retardant material;
(c) encapsulating at least some of the fire-retardant material with a coating that is stable in the presence of the electrolyte;
(d) receiving negative and positive electrodes; and
(e) combining the electrolyte, encapsulated fire-retardant material from step (c), and the negative and positive electrodes in a suitable construction for the battery.

The "receiving" steps can be performed by the same entity as the entity that provides such electrolyte, fire-retardant material, and electrodes. Alternatively, one or more of the electrolyte, fire-retardant material, and electrodes can be provided by a different entity than the entity that receives them.

The fire-retardant material can be selected from the group consisting of an alkyl phosphate, a phosphazene, and a fluorinated derivative of any of the foregoing. Preferably, the fire-retardant material is encapsulated with one or more materials selected from the group consisting of an oligomer, a polymer, a hydrocarbon, and an ionic liquid.

In some method embodiments, the fire-retardant material, in free form, is not itself electrochemically or chemically stable in the presence of the electrolyte, but the substantially encapsulated fire-retardant material is electrochemically and chemically stable in the presence of the electrolyte.

Methods can further introduce a porous matrix to carry the fire-retardant material. Methods can alternatively, or additionally, introduce a porous mandrel rod, wherein the rod substantially encapsulates the fire-retardant material.

DETAILED DESCRIPTION OF EMBODIMENTS OF THE INVENTION

The systems and methods of the present invention will now be described in detail by reference to various non-limiting embodiments of the invention.

Unless otherwise indicated, all numbers expressing dimensions, temperatures, and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques.

Some embodiments of the present invention will now be described in more detail, including reference to the accompanying figures. The figures provide representative illustration of the invention and are not limiting in their content. It will be understood by one of ordinary skill in the art that the scope of the invention extends beyond the specific embodiments depicted. This invention also incorporates routine experimentation and optimization of the methods, apparatus, and systems described herein.

In some variations of this invention, an effective fire-retardant material is substantially encapsulated within a battery. As used herein, a fire-retardant material being "substantially encapsulated" means that a plurality of capsules or microcapsules are formed or present. Each capsule or microcapsule may be a sphere or other similar shape, i.e. any rounded body approximately of spherical form. The material inside each capsule or microcapsule, known as the core, internal phase, or fill, comprises the fire-retardant material. The wall of each capsule or microcapsule, sometimes called the shell, coating, or membrane, is preferably both chemically and electrochemically stable in the normal environment of the battery. The core (comprising flame-retardant material) may include crystals, adsorbent particles, an emulsion, a suspension of solids, or a suspension of smaller microcapsules. Some of the capsules or microcapsules may have multiple walls.

The coating is preferably thermally stable in the temperature range of battery operation. In preferred embodiments, the coating is designed so as to melt when the battery temperature becomes higher than some upper limit, such as about the temperature associated with battery thermal runaway (e.g., less than 100° C., about 100° C., 110° C., 120° C., 130° C., 140° C., 150° C., 160° C., 170° C., 180° C., 190° C., or higher). Such melting can release the fire-retardant material to mitigate fire or explosion hazards.

The encapsulated fire-retardant material preferably has no contact with the electrolyte and electrodes (both cathode and anode) under normal battery operating conditions. Preferred embodiments therefore minimize or eliminate negative impacts that arise from direct mixing fire-retardant materials with electrolyte in a lithium-based or other battery.

In some embodiments of the invention, fire-retardant materials are encapsulated into polymer spheres, which are chemically and electrochemically stable in a lithium-ion battery. The polymer-sphere material is selected to be thermally stable in the temperature range of the battery operation but not stable (with respect to phase transitions) at a temperature in excess of this temperature range. In these embodiments, the polymer spheres melt to release the fire-retardant materials to retard battery thermal runaway when the battery temperature exceeds a prescribed temperature operation range. The melting point of the polymer is preferably higher than the temperature for safe battery operation, and lower than the temperature associated with thermal runaway of the battery. The temperature of battery operation can vary, as is known, but exemplary operation temperatures can be from about −20° C. to about 80° C., preferably from about 0° C. to about 60° C. For electric-vehicle applications, environmental temperatures can be extremely low (less than −20° C.) in some geographies.

The encapsulated fire-retardant material preferably has no contact with the electrolyte and electrodes under normal operating conditions of the battery. Some embodiments, therefore, can minimize the performance reduction caused by directly mixing fire-retardant materials with electrolyte—such as fast capacity fading, lower capacity utilization, lower power, or poorer low-temperature performance.

In some variations of the invention, the following steps are carried out:

(a) receiving an electrolyte;
(b) receiving a fire-retardant material;
(c) encapsulating at least some of the fire-retardant material with a coating that is stable in the presence of the electrolyte;
(d) receiving negative and positive electrodes; and
(e) combining the electrolyte, encapsulated fire-retardant material from step (c), and the negative and positive electrodes in a suitable construction for the battery.

The "receiving" steps can be performed by the same entity as the entity that provides such electrolyte, fire-retardant material, and electrodes. Alternatively, one or more of the electrolyte, fire-retardant material, and electrodes can be provided by a different entity than the entity that receives them. Receiving a material can generally be accomplished by an entity producing such material, or by having another entity produce all or a portion of the material. Also, as is known commercially, multiple entities can collaborate to manufacture portions of a material, which can ultimately be provided to the entity wishing to receive the material.

Certain embodiments of the present invention will now be further described with reference to the accompanying drawings, which by no means should be construed to limit the invention.

Figure 1:
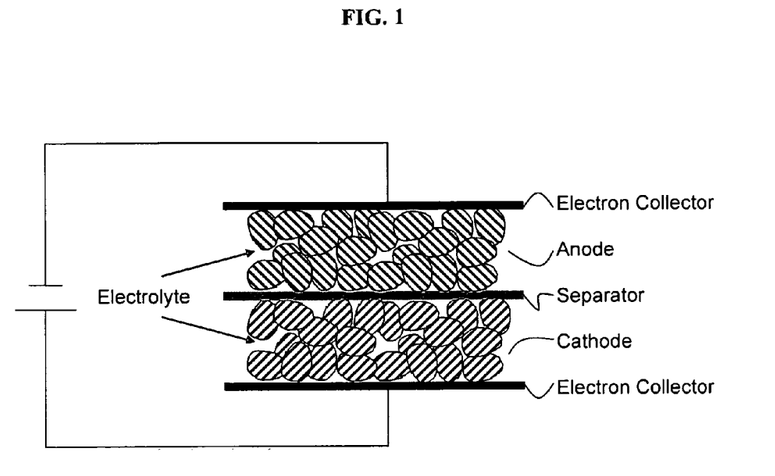
FIG. 1 shows a typical structure of a lithium-ion battery, in which a liquid electrolyte is filled in the pores of both cathode and anode layers to provide conductive paths to Li ions between cathode and anode.

FIG. 1 shows a typical structure of a rechargeable lithium-ion battery. The primary functional components of a lithium-ion battery are the anode, cathode, and electrolyte, in which a lithium ion moves between the anode and cathode in the electrolyte. A separator is used to separate cathode and anode to prevent electron shortage. Electron collectors, normally metal, are used to collect electrons from both cathode and anode. The lithium ion moves from the anode to the cathode during discharge and from the cathode to the anode when charging. Therefore, the anode can act as either a positive or negative electrode, while the cathode can act as either a negative or positive electrode, depending on the circumstances.

In a conventional Li-ion cell, the anode is made from carbon, the cathode is a metal oxide, and the electrolyte is a lithium salt in an organic solvent. A substantial safety concern relates to the flammability of common carbonate-based electrolytes which may lead to fire in many cases, such as short circuit and overcharge of the battery. Normally, battery thermal runaway can happen when hydrogen radicals (H.) and oxygen (O. or $O_2$) react, which is a chain reaction through hydroxide radicals (OH.) capable of generating huge amounts of heat in the battery. The hydrogen radical and oxygen can be produced from thermal decomposition of carbonate solvents in the electrolyte and the metal oxide cathode, respectively.

Figure 2:
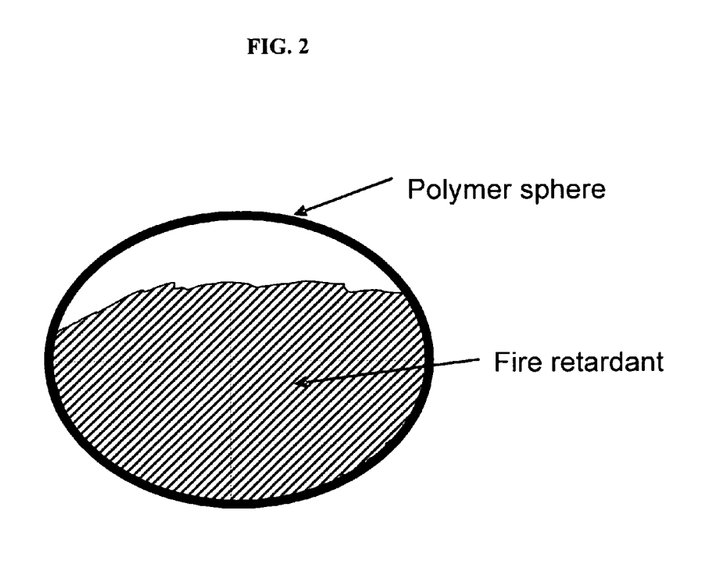
FIG. 2 depicts an encapsulated fire-retardant material contained in a polymer sphere, according to some embodiments of the invention.

In some embodiments, this invention provides a method to improve safety while maintaining the performance of a lithium-based battery. FIG. 2 illustrates a fire-retardant (FR) encapsulated polymer sphere. Preferably, the polymer sphere is thermally stable in a temperature range suitable for battery operation. The fire-retardant material is not necessarily itself electrochemically or chemically stable in the environment of a lithium battery, thereby allowing for a wide range of potential fire-retardant materials. Indeed, the fire-retardant material is preferably chemically active in the environment of a lithium battery.

The fire-retardant materials may include any materials that can either stop chain reactions of hydrogen and oxygen (e.g., by trapping hydrogen), and/or react with Li ions to form stable compounds, so as to stop thermal runaway in the lithium battery. It is generally preferred to select a fire-retardant material that is capable of reducing (and preferably stopping) the migration of lithium ions between negative and positive electrodes. Without being limited by any particular theory, it is believed that formation of stable lithium compounds can effectively decrease or even shut down the appropriate electrochemistry involving lithium ions, thereby decreasing the likelihood of battery thermal runaway.

In some variations, the fire-retardant material is solid at room temperature (about 25° C.). In other variations, the fire-retardant material is liquid at room temperature. In certain variations, the fire-retardant material includes both solid and liquid components at room temperature. Of course, fire-retardant materials that are solid at room temperature may be liquid (or vapor) at battery operation temperatures that exceed room temperature. Likewise, retardant materials that are liquid at room temperature may be solid at battery operation temperatures that are below room temperature.

The temperature of battery operation can be from about −20° C. to about 80° C., preferably from about 0° C. to about 60° C. A normal battery operation temperature can be near room temperature (e.g., about 25° C.) or slightly higher (e.g. about 30-40° C.). The temperature associated with battery thermal runaway will depend at least on the specific battery construction. The thermal runaway temperature can be about 100° C. or less, such as about 60° C., 70° C., 80° C., or 90° C. In other embodiments, the thermal runaway temperature can be in the range of about 100-150° C., about 150-200° C., or even higher. It is preferred, although not necessary, to select a fire-retardant material and an encapsulating material using knowledge or an estimate of both the intended operation temperature range as well as the thermal runaway temperature.

The invention is not limited to any particular class of fire-retardant materials, although it is important to select an effective material. In some embodiments, the boiling point of the fire-retardant material is between about 80° C. and about 200° C. For example, alkyl phosphates may be used as well as fluorinated derivatives thereof. An example of one preferred alkyl phosphate fire-retardant material is trimethyl phosphate, which is the trimethyl ester of phosphoric acid. The melting point of trimethyl phosphate is −46° C. and its boiling point is 197° C.

Phosphazenes may be used as the fire-retardant material, in some embodiments. A phosphazene is any chemical compound in which a phosphorus atom is covalently linked to a nitrogen atom by a double bond and to three other atoms or radicals by single bonds. Examples of phosphazenes include, but are not limited to, hexachlorocyclotriphosphazene, bis (triphenylphosphine)iminium chloride, and hexamethoxycyclotriphosphazene.

Other fire-retardant materials that can be used include, but are by no means limited to, phenyl phosphates, phenyl-alkyl phosphates, ammonium sulfates, ammonium phosphates, phospholanes, silanes, fluorinated carbonates, and fluorinated polyethers. Of course, mixtures of more than one chemical can be present in a fire-retardant material.

A selected fire-retardant material can optionally be present along with various additives, inert components, and so on, as will be appreciated. For example, dispersion agents can be added, such as alkylarylsulfonic acids, fluoroaliphatic surfactants, and the like. Stabilizers can be added, such as ammonium salts, amine salts, etc. These additives may or may not themselves technically contribute to flame retarding.

The material for the encapsulating phase, or coating, is preferably both chemically and electrochemically stable with the electrolyte present in the battery. This material can be an oligomer, a polymer, an ionic liquid, a large molecule (i.e. a chemical having a high molecular weight, such as a long-chain hydrocarbon), for example. The coating material can be an organic chemical or an inorganic chemical.

In certain embodiments with respect to lithium-ion batteries, the material selected for the coating is a polymer having a melting point between about 80° C. and about 200° C. Such polymer materials may be selected from polyolefins, vinyl polymers, acrylic polymers, polyamides, and polyoxides. For example, the polymer can be selected from the group consisting of poly(1-butene), polyethylene, and 1,4-poly(2,3-azabutadiene). It is preferred to select a polymer having a melting point lower than the temperature associated with thermal runaway of the battery. As is known in the art, "runaway temperatures" can vary based on conditions and the specific construction of the battery; exemplary runaway temperatures are within the range of about 120-220° C. and can be determined or estimated by experimentation or reaction modeling, if desired.

When the coating is a polymer, the capsules or microcapsules can take the form of polymer spheres. These polymer spheres can be a variety of sizes; a diameter range of about 100 nanometers to several micrometers is typical.

Encapsulating the fire-retardant material can be accomplished by a variety of physical means, such as fluid bed coating, spray coating, pan coating, air-suspension coating, centrifugal extrusion, and core-shell encapsulation or microgranulation (matrix-encapsulation). Encapsulating the fire-retardant material can alternatively be accomplished by a variety of chemical means, such as interfacial polymerization, in-situ polymerization, and matrix polymerization.

The amount of encapsulating (coating) phase, relative to the amount of fire-retardant material, can vary widely. It is desirable to provide enough fire-retardant material so that fires or explosions are prevented in the event of excessive battery temperatures, as well as enough encapsulating material so that the fire-retardant material does not contact the electrolyte under normal conditions. In various embodiments, the weight ratio of fire-retardant material (internal core phase) to encapsulating material (coating phase) is less than about 100, and typically less than about 10, such as about 1 to about 5.

Figure 3:
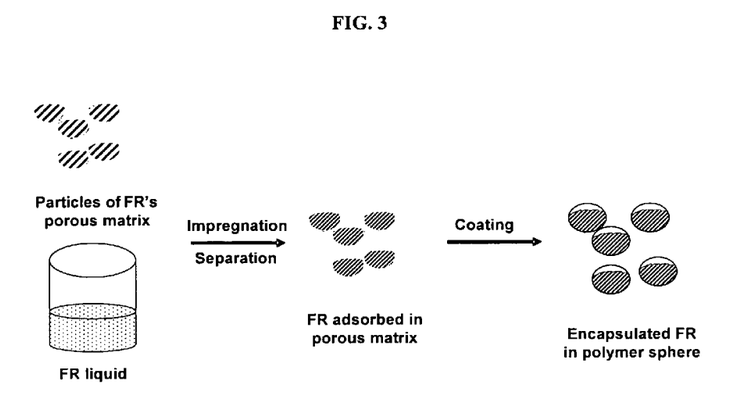
FIG. 3 is a sketch illustrating an exemplary method of encapsulating a liquid fire-retardant material into a polymer sphere, in some embodiments.

If the fire-retardant material is a solid and can be made into suitably small particles, direct encapsulation can be applied. If the fire-retardant material is a liquid, a porous matrix may optionally be employed as a carrier to adsorb the liquid fire-retardant material prior to the encapsulation process. FIG. 3 illustrates an exemplary process for encapsulating a liquid fire-retardant material. The porous matrix may consist essentially of porous oxides, such as $SiO_2$, $TiO_2$, $Al_2O_3$; or porous carbon; or various combinations thereof.

Figure 4:
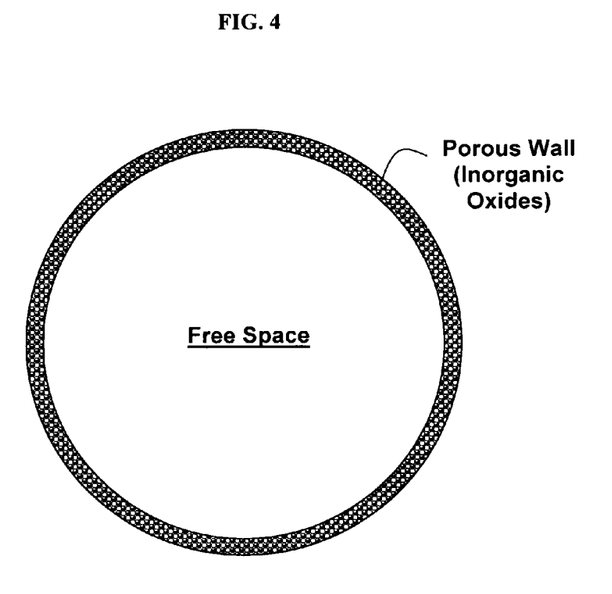
FIG. 4 is an illustration of a hollow glass microsphere suitable for use as a carrier for liquid fire-retardant material, in some embodiments.

In some embodiments, hollow glass microspheres can be used as a carrier for liquid fire-retardant material. Hollow glass microspheres typically have porous walls, small particle sizes (e.g., about 0.5-10 μm), high free-volume density, and good mechanical strength. Glass microspheres can be made by ultrasonic spray pyrolysis, among other known techniques. Preferred hollow glass microspheres are inexpensive and exhibit good chemical stability with many fire-retardant materials. FIG. 4 depicts an exemplary hollow glass microsphere.

Figure 5:
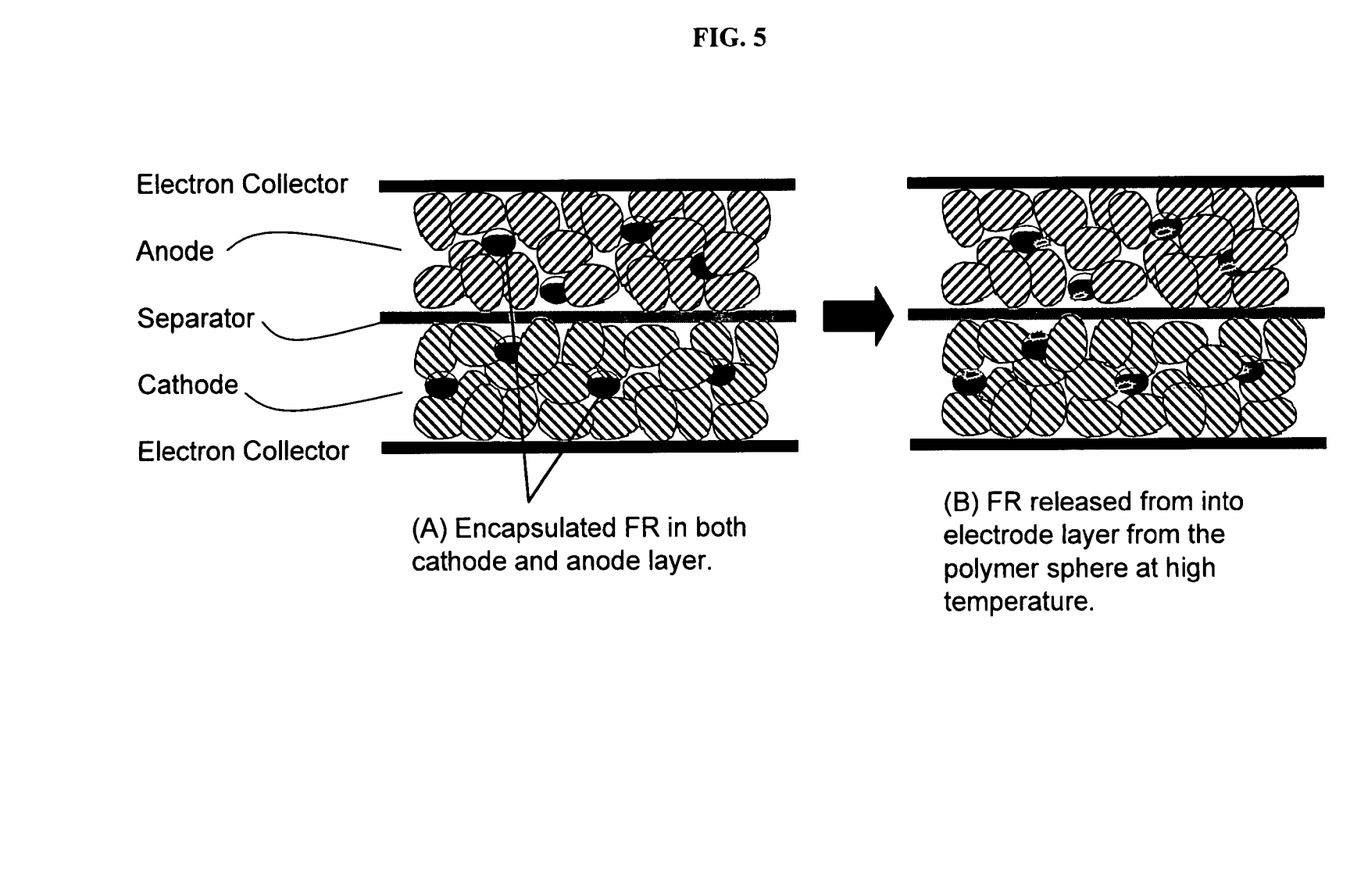
FIG. 5 depicts the release of fire-retardant material into the electrode layers of a battery in the presence of heat, according to some embodiments.

FIG. 5 illustrates the manner in which some embodiments of the invention can minimize thermal runaway in a preferred battery. In these embodiments, small polymer spheres (less than a few micrometers in diameter) encapsulated with fire-retardant material are mixed with normal electrolyte when a battery is assembled. The encapsulated fire-retardant material should not contact the electrolyte and electrodes under normal operation conditions of the battery. It is intended that the polymer spheres substantially melt (i.e., the coating phase melts or begins to melt) to release the fire-retardant material when the battery temperature becomes excessive.

The rate of release can vary, depending at least on the specific fire-retardant material, the choice of encapsulating (coating) material, and the battery temperature. Preferably, the rate of release upon melting of the polymer spheres is at least sufficient to provide an effective amount of fire-retardant material into the anode and/or cathode layers, thereby preventing fires or explosions.

The rate of release can be increased by selecting a fire-retardant material that has a boiling point between battery operation temperature and thermal runaway temperature. In these embodiments, the vaporized fire-retardant material can break through the encapsulating (coating) materials to reduce, or stop, the thermal runaway reaction chain. Vaporized fire-retardant material can traverse through the coating by gas-liquid or gas-solid diffusion, by convective mass transfer (e.g. bubbles of vapor flowing through the melted or melting coating phase), or by some other means. As will be appreciated, diffusion and mass-transfer rates of vapors can be much higher than those of liquids, so these embodiments can be beneficial to not only increase the rate of release of fire-retardant material, but also increase mitigation rates associated with lithium ions or other species involved.

In some embodiments, spheres encapsulated with fire-retardant material can be mixed with normal electrolyte when a battery is assembled. The encapsulated fire-retardant material can be present in the anode layer, the cathode layer, or both the anode and cathode layers (as shown in FIG. 5).

The amount of encapsulated fire-retardant material can be varied. It is desirable to provide enough fire-retardant material so that fires or explosions are prevented in the event of excessive battery temperatures, but not too much fire-retardant material so as to decrease power capacity of the battery. In various embodiments, the weight ratio of encapsulated fire-retardant material (coating plus internal core phase) to electrolyte is between about 0.01 to about 10, such as about 0.1 to about 1.

Figure 6:
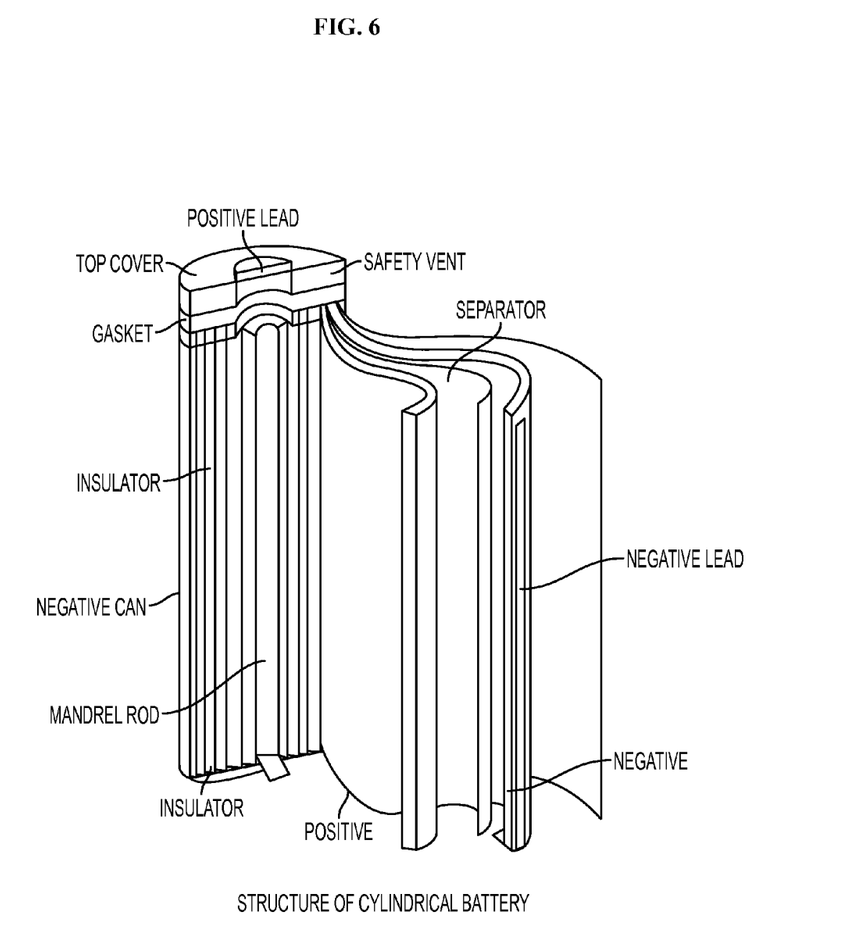
FIG. 6 illustrates some variations wherein a fire-retardant material is stored in a porous mandrel rod in a cylindrical battery.
Figure 7:
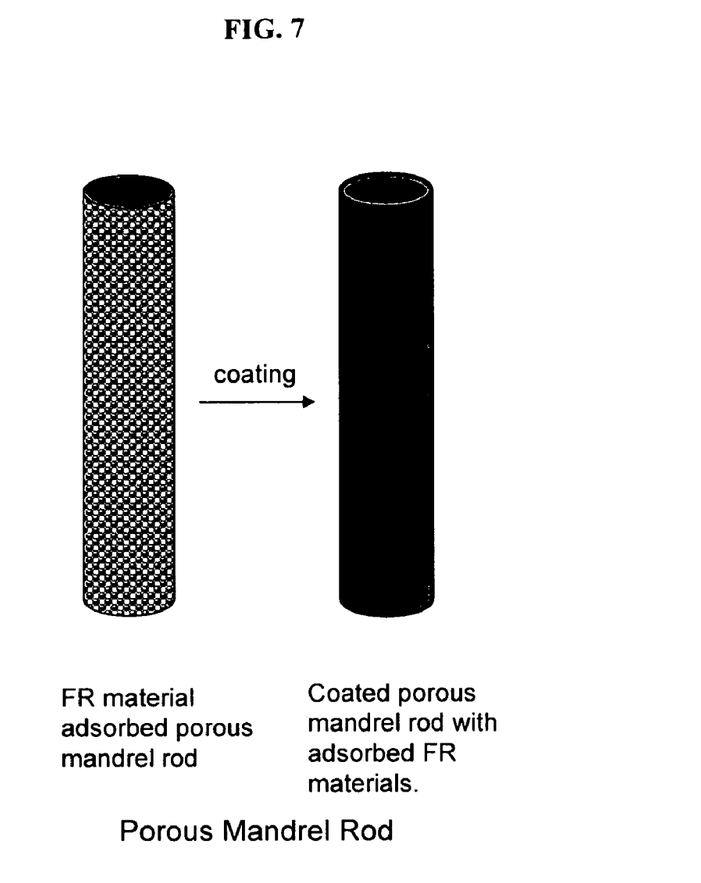
FIG. 7 depicts some variations employing a coated porous mandrel rod.

In certain embodiments, the polymer spheres can be stored in a spare space in a battery, where extra electrolyte is typically stored. For example, in a cylinder-type battery, the fire-retardant material can be stored in a porous mandrel rod coated with the sphere material, which is located in the center of the battery (see FIGS. 6 and 7). The fire-retardant materials stored in the porous mandrel rod can be released, and dispersed into the electrode layer, when the temperature of the battery exceeds the melting point of the polymer coated in the rod.

The present invention can minimize the performance reduction caused by directly mixing fire-retardant materials with battery electrolyte. Certain variations can provide improved battery performance including reduced capacity fading, higher capacity utilization, enhanced power, and good low-temperature performance. This invention is suitable for high-voltage lithium-ion batteries.

Practical applications for this invention include, but are not limited to, laptop computers, mobile phones, cameras, electric vehicles, and aerospace components. Electric vehicles, in particular, can benefit from batteries that offer high energy density and power without compromising safety.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, equations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A battery comprising an electrolyte, a negative electrode, a positive electrode, and a fire-retardant material substantially encapsulated inside a plurality of polymer microcapsules.

2. The battery of claim 1, wherein said battery is a lithium-based battery.

3. The battery of claim 1, wherein said battery is a lithium-ion battery.

4. The battery of claim 1, wherein said fire-retardant material is capable of terminating a reaction involving a hydrocarbon-based organic material and oxygen.

5. The battery of claim 3, wherein said fire-retardant material is capable of reducing the migration of lithium ions between said negative and positive electrodes.

6. The battery of claim 1, wherein said fire-retardant material is a solid at 25° C.

7. The battery of claim 1, wherein said fire-retardant material is a liquid at 25° C.

8. The battery of claim 1, wherein said fire-retardant material has a normal boiling point above an operation temperature of said battery and below a thermal runaway temperature of said battery.

9. The battery of claim 1, wherein said fire-retardant material has a normal boiling point selected from about 80° C. to about 200° C.

10. The battery of claim 1, wherein said fire-retardant material is selected from the group consisting of an alkyl phosphate, a phosphazene, and a fluorinated derivative of any of the foregoing.

11. The battery of claim 10, wherein said fire-retardant material is trimethyl phosphate.

12. The battery of claim 1, wherein said fire-retardant material, in free form, is not itself electrochemically or chemically stable in the presence of said electrolyte, and wherein said substantially encapsulated fire-retardant material is electrochemically and chemically stable in the presence of said electrolyte.

13. The battery of claim 7, wherein said substantially encapsulated fire-retardant material further comprises a porous matrix.

14. The battery of claim 13, wherein said porous matrix is fabricated from one or more materials selected from the group consisting of $SiO_2$, $TiO_2$, $Al_2O_3$, and C.

15. The battery of claim 13, wherein said porous matrix is fabricated from hollow glass microspheres.

16. The battery of claim 1, wherein said negative electrode is adjacent to a first portion of said substantially encapsulated fire-retardant material, and wherein said positive electrode is adjacent to a second portion of said substantially encapsulated fire-retardant material.

17. The battery of claim 1, wherein at least some of said substantially encapsulated fire-retardant material is not adjacent to either of said negative electrode or said positive electrode.

18. The battery of claim 1, said battery comprising a porous mandrel rod coated with said fire-retardant material.

19. A lithium-ion battery comprising an electrolyte, a negative electrode, a positive electrode, and a fire-retardant material substantially encapsulated inside a plurality of polymer microcapsules.

20. The battery of claim 19, wherein said fire-retardant material is selected from the group consisting of an alkyl phosphate, a phosphazene, and a fluorinated derivative of any of the foregoing.

21. The battery of claim 19, wherein said polymer is selected from the group consisting of an olefinic polymer, a vinyl polymer, an acrylic polymer, a polyamide polymer, a polyoxide polymer, and any mixtures of the foregoing.

22. The battery of claim 21, wherein said polymer is selected from the group consisting of poly(1-butene), polyethylene, and 1,4-poly(2,3-azabutadiene).

23. The battery of claim 19, wherein the melting point of said polymer is less than a thermal runaway temperature associated with said battery.

24. The battery of claim 19, wherein said fire-retardant material has a normal boiling point above an operation temperature of said battery and below a thermal runaway temperature of said battery.

25. A method of fabricating a battery, said method comprising:
(a) receiving an electrolyte;
(b) receiving a fire-retardant material;
(c) substantially encapsulating at least some of said fire-retardant material inside a plurality of polymer microcapsules having a coating that is stable in the presence of said electrolyte;
(d) receiving negative and positive electrodes; and
(e) combining said electrolyte, substantially encapsulated fire-retardant material from step (c), and said negative and positive electrodes in a suitable construction for said battery.

26. The method of claim 25, wherein said battery is a lithium-ion battery.

27. The method of claim 25, wherein said fire-retardant material is selected from the group consisting of an alkyl phosphate, a phosphazene, and a fluorinated derivative of any of the foregoing.

28. The method of claim 25, wherein said fire-retardant material, in free form, is not itself electrochemically or chemically stable in the presence of said electrolyte, and wherein said substantially encapsulated fire-retardant material is electrochemically and chemically stable in the presence of said electrolyte.

29. The method of claim 25, said method further comprising introducing a porous matrix suitable for said fire-retardant material.

30. The method of claim 25, said method comprising introducing a porous mandrel rod coated with said fire-retardant material.

31. A battery comprising an electrolyte, a negative electrode, a positive electrode, and a substantially encapsulated fire-retardant material, wherein said fire-retardant material, in free form, is not itself electrochemically or chemically stable in the presence of said electrolyte, and wherein said substantially encapsulated fire-retardant material is electrochemically and chemically stable in the presence of said electrolyte.

32. The battery of claim 31, wherein said fire-retardant material is encapsulated with one or more materials selected from the group consisting of an oligomer, a polymer, a hydrocarbon, and an ionic liquid.

33. A method of fabricating a battery, said method comprising:
(a) receiving an electrolyte;
(b) receiving a fire-retardant material;
(c) substantially encapsulating at least some of said fire-retardant material with a coating that is stable in the presence of said electrolyte;
(d) receiving negative and positive electrodes; and
(e) combining said electrolyte, substantially encapsulated fire-retardant material from step (c), and said negative and positive electrodes in a suitable construction for said battery,
wherein said fire-retardant material, in free form, is not itself electrochemically or chemically stable in the presence of said electrolyte, and wherein said substantially encapsulated fire-retardant material is electrochemically and chemically stable in the presence of said electrolyte.

34. The method of claim 33, wherein said fire-retardant material is encapsulated with one or more materials selected from the group consisting of an oligomer, a polymer, a hydrocarbon, and an ionic liquid.

* * * * *